(12) United States Patent
Wybenga et al.

(10) Patent No.: US 7,562,111 B2
(45) Date of Patent: Jul. 14, 2009

(54) MULTI-PROCESSOR ARCHITECTURE WITH HIGH CAPACITY I/O

(75) Inventors: Jack C. Wybenga, Plano, TX (US); Patricia K. Sturm, Marion, IA (US); Mark Lang, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 842 days.

(21) Appl. No.: 11/091,731

(22) Filed: Mar. 28, 2005
(Under 37 CFR 1.47)

(65) Prior Publication Data

US 2005/0267930 A1    Dec. 1, 2005

Related U.S. Application Data

(60) Provisional application No. 60/575,589, filed on May 27, 2004, provisional application No. 60/575,590, filed on May 27, 2004.

(51) Int. Cl.
*G06F 15/16* (2006.01)

(52) U.S. Cl. .................................. 709/201; 709/227
(58) Field of Classification Search .............. 709/201
See application file for complete search history.

(56) References Cited

U.S. PATENT DOCUMENTS

| | | | | |
|---|---|---|---|---|
| 4,153,942 | A * | 5/1979 | Gregory | 712/223 |
| 4,665,520 | A * | 5/1987 | Strom et al. | 714/15 |
| 6,108,731 | A * | 8/2000 | Suzuki et al. | 710/301 |
| 6,714,945 | B1* | 3/2004 | Foote et al. | 707/104.1 |
| 2005/0071578 | A1* | 3/2005 | Day et al. | 711/153 |

\* cited by examiner

*Primary Examiner*—Patrice Winder
*Assistant Examiner*—Minh-Chau Nguyen

(57) ABSTRACT

Channelized I/O is provided for a data processing architecture. An application is executed on a data processor. Program instructions are executed in parallel, and independently of the data processor, to provide a plurality of data communication channels which can communicate with an external site that is physically separate from the data processor.

20 Claims, 5 Drawing Sheets

MULTI-PROCESSOR ARCHITECTURE WITH HIGH CAPACITY I/O

The present invention claims the priority under 35 USC § 119(e) of the following co-pending U.S. Provisional Applications:

1) U.S. Provisional Patent Application Ser. No. 60/575,589, entitled "DISTRIBUTION OF OPERATING SYSTEM FUNCTIONS IN THE ORION HIGH CAPACITY I/O PROCESSOR," filed on May 27, 2004; and
2) U.S. Provisional Patent Application Ser. No. 60/575,590 entitled "HIGH PERFORMANCE ASYMMETRIC MULTI-PROCESSOR WITH SEQUENTIAL PROGRAMMING MODEL," filed May 27, 2004.

The subject matter disclosed in each of Patent Application Ser. Nos. 60/575,589 and 60/575,590 is hereby incorporated by reference into the present disclosure as if fully set forth herein.

TECHNICAL FIELD OF THE INVENTION

The invention relates generally to data processing and, more particularly, to I/O (input/output) throughput in data processing.

BACKGROUND OF THE INVENTION

The capacity of communication media and communication interfaces in data networks continues to increase. These ever-increasing data communication capabilities make it possible to reduce the amount of time required to perform data transfers between remote sites in a data network. For example, a file server with suitably high I/O throughput capability can exploit high speed communication media to reduce the time required to transfer data to or from a remote data storage site in a data network. High I/O throughput is important in systems such as Storage Area Networks (SAN), Redundant Arrays of Independent Disks (RAID) controllers, sales transaction processing computers, bank teleprocessing computers, file servers for workgroup file sharing, reservation systems, and database application servers.

Conventional personal computers (PCs) and other desk top computers have traditionally used rather slow I/O busses, such as PCI busses, which basically set a limit on the I/O throughput that the computer can achieve. Although such conventional computer architectures can provide enough I/O throughput to fully utilize communication interfaces and media that support 10-100 Mbps data rates, nevertheless, as supported data rates increase to 1-10 Gbps and beyond, the I/O throughput capabilities of the conventional architectures can no longer fully utilize the additional communication bandwidth. Thus, the I/O throughput of the computer, rather than the communication media and interfaces, is becoming the limiting factor for data transfers in a network.

Within the field of data processing, most of the work related to enhancing I/O throughput has been in the area of mainframe and supercomputer architectures. Conventional mainframe and supercomputer architectures can provide a relatively high I/O throughput. However, mainframes and supercomputers are also designed to be very powerful data processing computers, which entails a relatively large cost, both financially and in terms of physical size. Accordingly, and notwithstanding their relatively high I/O throughput capabilities, mainframe and supercomputer architectures are not particularly well-matched to the task of transferring data between remote sites in a data network.

It is therefore desirable to provide a data processing architecture which can provide the type of I/O throughput normally associated with mainframe and supercomputer architectures, and which also avoids the aforementioned costs associated with mainframe and supercomputer architectures.

SUMMARY OF THE INVENTION

To address the above-discussed deficiencies of the prior art, it is a primary object of the present invention to provide, a data processing architecture with a channelized I/O for increased I/O throughput. A data processor executes an application, and, by virtue of program instructions executed in parallel and independently of the data processor, a plurality of data communication channels are provided to communicate data with an external site that is physically separate from the data processor.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts.

DETAILED DESCRIPTION OF THE INVENTION

FIGS. 1 through 5, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged data processing apparatus.

Figure 1:
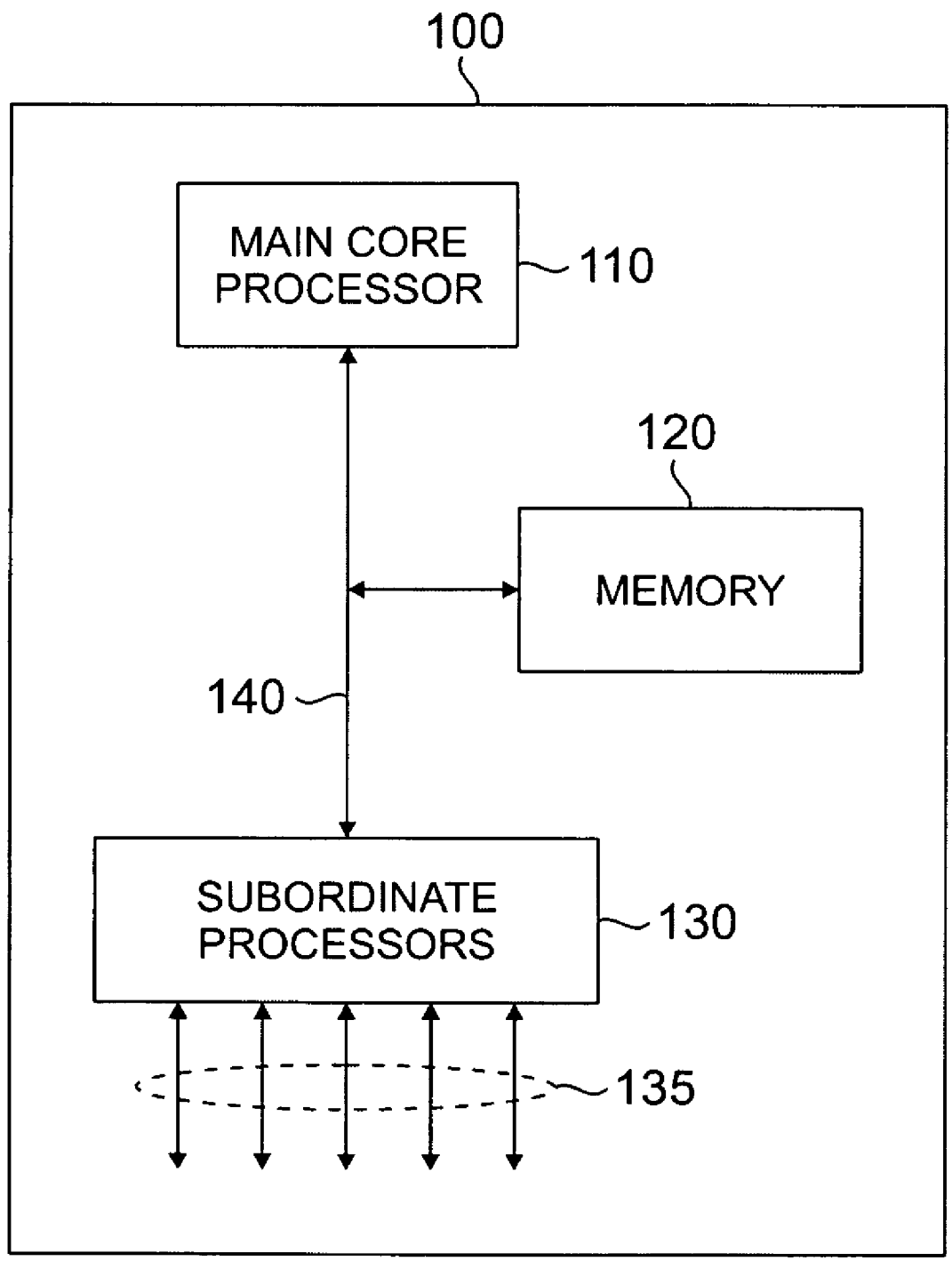
FIG. 1 illustrates a data processing architecture according to an exemplary embodiment of the present invention.

FIG. 1 illustrates a data processing architecture according to an exemplary embodiment of the invention. The data processing architecture 100 includes a main core processor 110, a plurality of subordinate processors 130, and memory 120. The main core processor 110 is coupled by bus structure 140 for communication with the subordinate processors 130 and with memory 120, and the subordinate processors 130 are also coupled by bus structure 140 for communication with memory 120. The subordinate processors 130 are cooperable with the main core processor 110 and memory 120 to provide the data processing architecture 100 with channelized I/O as indicated by the multiple I/O channels illustrated generally at 135.

Figure 2:
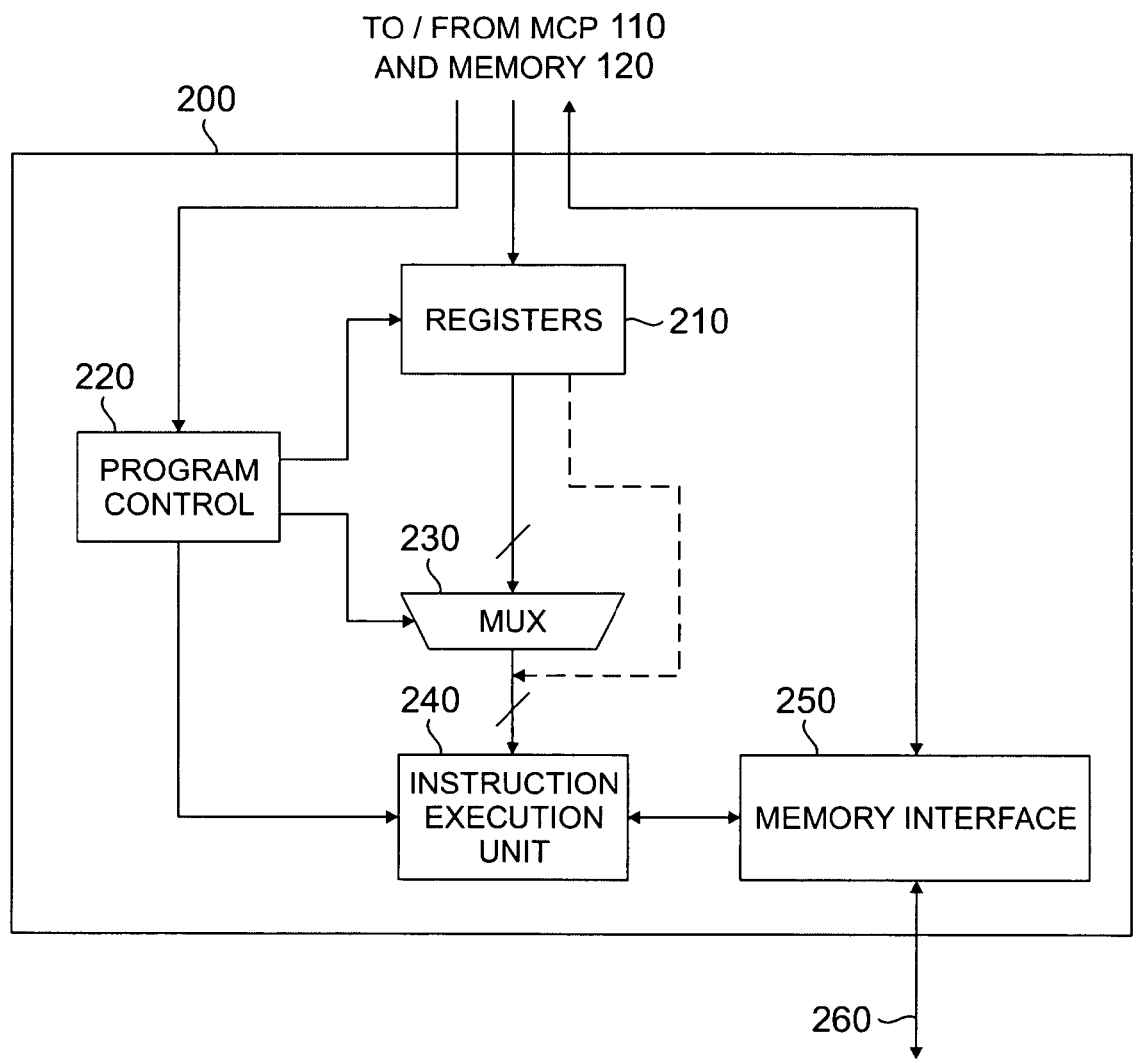
FIG. 2 illustrates the subordinate processors of FIG. 1 according to an exemplary embodiment of the present invention.

FIG. 2 is a simplified diagram of the subordinate processors of FIG. 1 according to an exemplary embodiment of the present invention. The subordinate processor 200 of FIG. 2 includes registers 210, a program control unit 220, an instruction execution unit 240, and a memory interface 250. The registers 210, program control unit 220, and memory interface 250 are connected to the bus structure 140 for communication with one another, and also with the main core processor 110 and memory 120 (see also FIG. 1). The program control unit 220 appropriately loads instructions and data from memory 120 into the registers 210.

In one embodiment, a plurality of sets of registers at 210 may be used in order to implement a corresponding plurality of execution threads. In such a multiple thread embodiment, a multiplexer 230 is connected between the registers 210 and the instruction execution unit 240, and the program control unit 220 controls the multiplexer 230 such that the registers associated with the desired thread are connected to the instruction execution unit 240. An alternate embodiment may implement only a single register set and a corresponding single execution thread. In such an embodiment, the single register set can be connected directly to the instruction execution unit 240, as indicated generally by broken line in FIG. 2.

Under control of the program control unit 220, the instruction execution unit 240 executes the instructions that it receives. Under control of the instruction execution unit 240, the memory interface 250 reads data from memory 120 via bus structure 140 and outputs the data on I/O channel 260. Also under control of the instruction execution unit 240, the memory interface 250 receives data from the I/O channel 260, and writes the received data into memory 120 via bus structure 140. Each of the subordinate processors illustrated at 130 in FIG. 1 implements an I/O channel, such as shown at 260 in FIG. 2, thereby providing the multiple-channel, or channelized, I/O 135 in FIG. 1.

Figure 3:
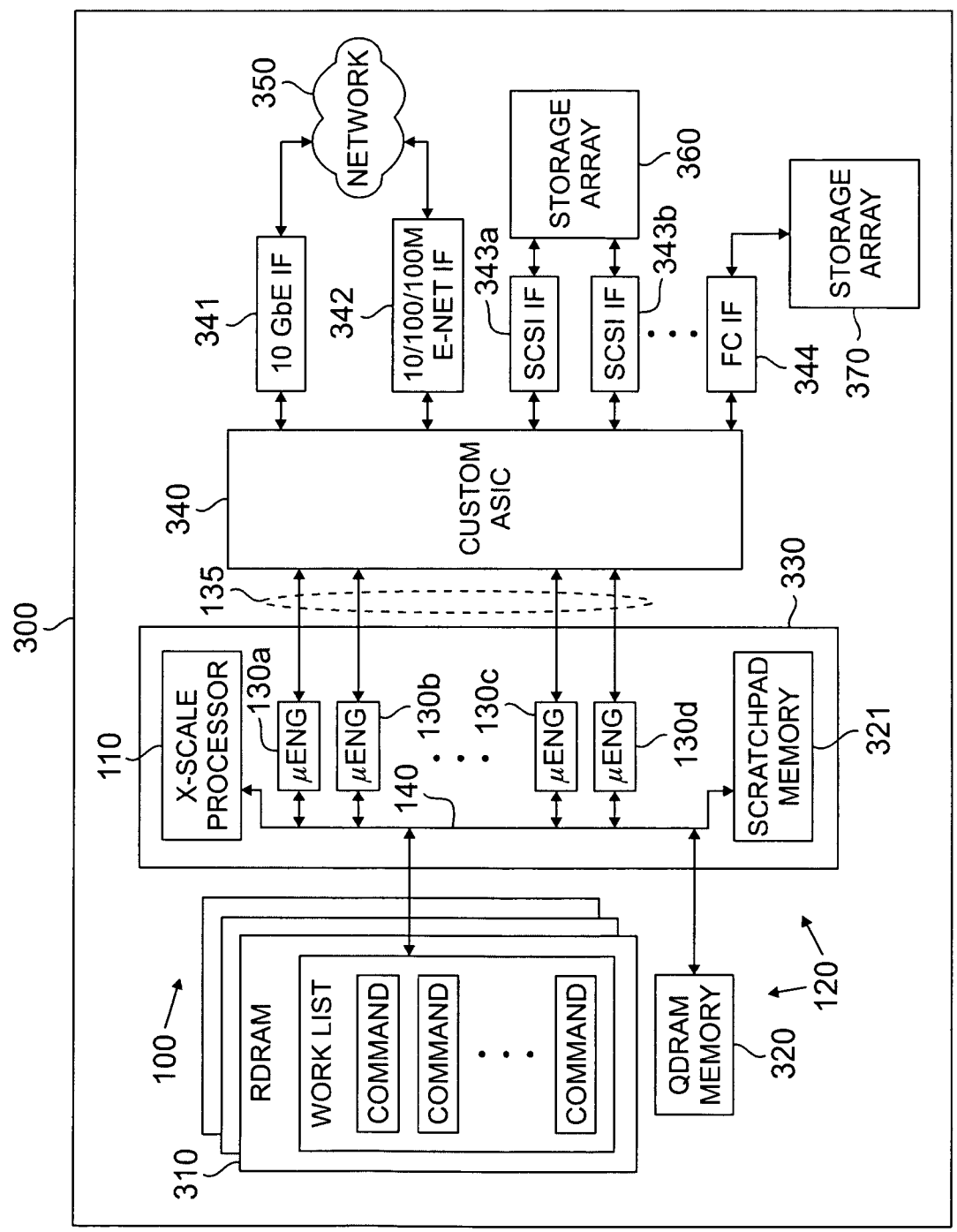
FIG. 3 illustrates a detailed example of the data processing architecture of FIG. 1 according to an exemplary embodiment of the present invention.

FIG. 3 illustrates a detailed example of the data processing architecture of FIGS. 1 and 2 according to an exemplary embodiment of the present invention. In the example of FIG. 3, the data processing architecture is utilized as a gateway or file server in a storage area network (SAN) 300. The main core processor 110 is implemented as an X-SCALE processor in FIG. 3, and the subordinate processors 130 are implemented as microengines 130a, 130b, etc. In an exemplary embodiment of the present invention, the X-SCALE processor and microengines are provided in a conventional network processor integrated circuit, for example the IXP2800 chips commercially available from Intel Corporation. A single-chip network processor is indicated generally at 330 in FIG. 3.

In the FIG. 3 example, the memory 120 of FIG. 1 includes RDRAM 310, QDRAM 320 and scratchpad memory 321. In an exemplary embodiment of the present invention, the scratchpad memory 321 is provided on-chip with the X-SCALE processor and the microengines.

The data processing architecture 100 is interfaced to a data network 350 and storage arrays 360 and 370 via an ASIC 340 (or an FPGA), Ethernet interfaces 341 and 342, SCSI interfaces 343a and 343b, and Fiber Channel (FC) interface 344. The interfaces at 341-344 are well known in the art. The ASIC 340 is designed to interface between the channelized I/O 135 of the data processing architecture 100 and the various interfaces 341-344. For example, in an embodiment which utilizes the IXP2800, the channelized I/O 135 is provided on the SPI-4 Phase 2 (SPI-4.2) I/O bus of the IXP2800. The ASIC 340 would thus interface to the SPI-4.2 bus and fan out the channelized I/O to the various external interfaces at 341-344.

The QDRAM 320 is used primarily to provide temporary storage of data that is being transferred either to the channelized I/O 135 from the RDRAM 310, or from the channelized I/O 135 to the RDRAM 310. A work list is also maintained in the RDRAM 310. The X-SCALE processor 110 can write commands into this work list, and the microengines 130a, 130b, etc. can access the commands and execute the functions specified by the commands. An exemplary embodiment may utilize 1-2 megabytes of QDRAM and two (2) gigabytes of RDRAM. In an exemplary embodiment of the present invention, the QDRAM and RDRAM are both provided on a single printed circuit board, together with the single-chip network processor 330.

In an exemplary embodiment of the present invention, the main core processor 110 stores commands in the work list of the RDRAM 310. For example, the main core processor could store a plurality of commands which respectively correspond to a plurality of desired storage disk accesses. The commands can indicate, for example, what instructions to execute, where data is (or will be) stored in memory, etc. The subordinate processors, acting independently as they become free to support the main core processor, can retrieve commands from the work list and make disk storage accesses in parallel, for example using the SCSI interfaces 343a and 343b.

For a write to disk storage, the subordinate processor transfers data from the RDRAM 310 out to the disk storage unit (e.g. 360). For a read from disk storage, the subordinate processor transfers data received from the disk storage unit into the RDRAM 310. These data transfers can be accomplished by the memory interface 250 of FIG. 2, under control of the instruction execution unit 240 of FIG. 2. This distribution of instruction execution to support I/O processing avoids the bottlenecks that can occur in mainframe or supercomputer architectures, wherein all instructions that control channelized I/O are executed in a single central processor unit, rather than in the I/O channels themselves.

Similar bottlenecks can of course also occur in conventional PC and other desktop architectures, where all I/O and data processing functionality is controlled by instruction execution performed in the central processing unit.

In an exemplary embodiment of the present invention, the main core processor 110 can utilize the bus structure 140 to provide commands directly to the various subordinate processors.

Figure 4:
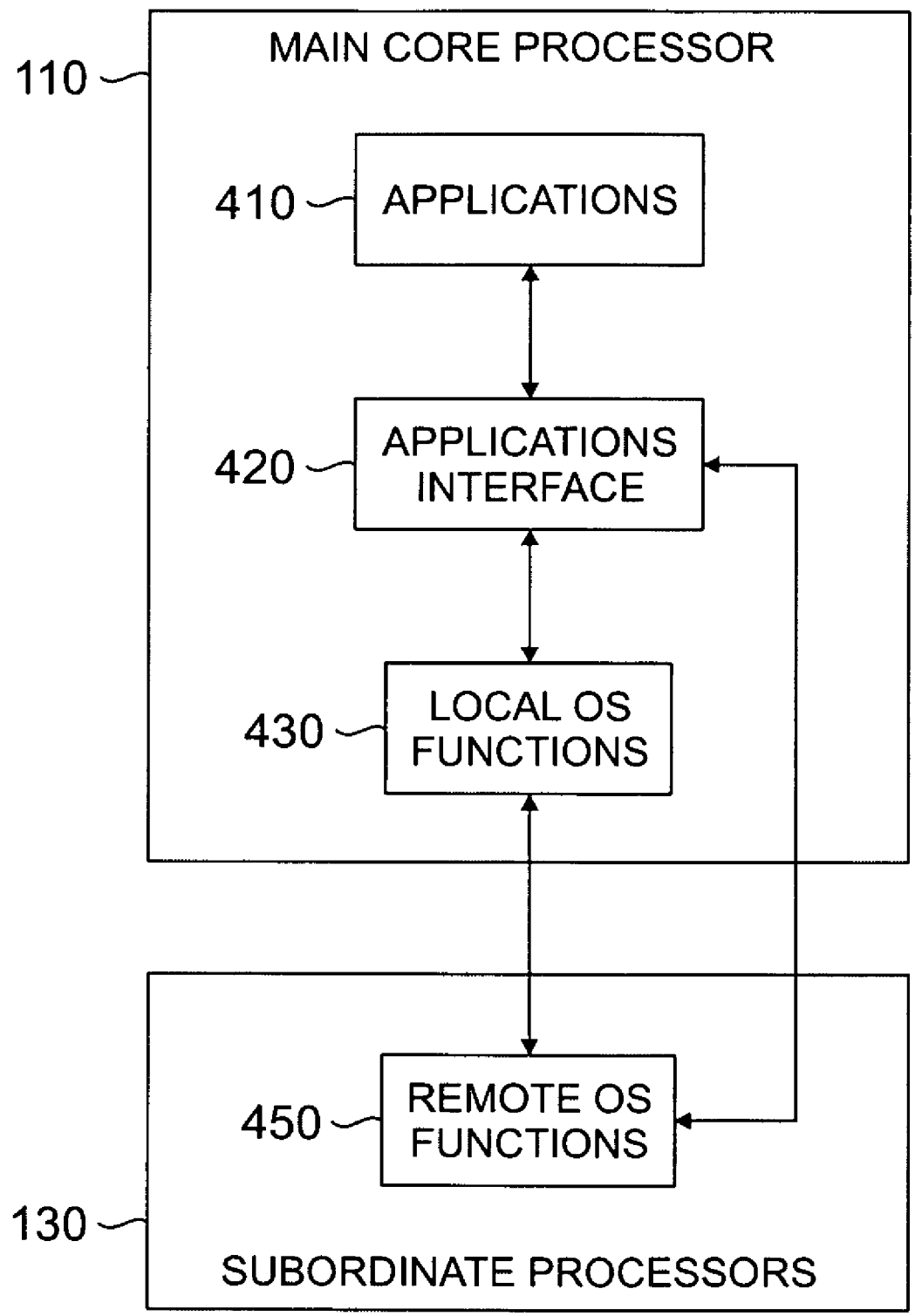
FIG. 4 illustrates a distributed operating system which can be utilized in the data processing architecture of FIGS. 1-3 according to an exemplary embodiment of the invention.

FIG. 4 illustrates a distributed operating system which can be utilized in the data processing architecture of FIGS. 1-3 according to an exemplary embodiment of the invention. As shown in FIG. 4, the main core processor 110 runs applications 410, for example file server applications. These applications are supported by an operating system that is distributed into and among the subordinate processors 130. In particular, the main core processor provides an application interface 420, and may also provide some local operating system functionality 430. However, the remainder of the operating system functionality is distributed among the subordinate processors 130. This distribution of operating system functionality among the subordinate processors 130 is indicated generally by the remote operating system functions 450 in FIG. 4.

In an exemplary embodiment of the present invention, the operating system is the well known Linux operating system, and the IP stack functionality of the Linux operating system is distributed into the subordinate processors 130 as a remote operating system function. The IP stack functionality uses a well-defined socket interface that can be easily relocated from the main processor into the subordinate processors 130. As another example, the Linux scheduler functionality is relatively easy to move because it is triggered by a timer and every system call returns through the scheduler.

In an exemplary embodiment of the present invention, the applications interface 420 makes the distribution of the operating system into the subordinate processors completely transparent to the applications 410. Accordingly, the applications 410 can run without modification on the main core processor 110 in the same manner as if the entire operating system were implemented on the main core processor 110.

If the distributed operating system is used to handle I/O requests from the main core processor 110, then the entire I/O process is rendered transparent to the application running on the main processor. More particularly, the application at 410 sees only the application interface 420, and the fact that the subordinate processors 130 handle the I/O operation is transparent to the application running on the main core processor 110. A typical disk storage read operation produces many interrupts before it is completed.

However, by distributing into the subordinate processors the operating system functionality associated with disk storage accesses, the many interrupts are seen only by the subordinate processors, and are invisible to the application running on the main core processor. As far as the application running on the main core processor is concerned, the application simply provides a disk storage read request to the applications interface 420, and this request results in a single interrupt, namely, an interrupt from the operating system indicating that the desired file is ready in RDRAM 310.

Operating system functions that are relatively slow, relatively frequently accessed, or both, can be distributed among the subordinate processors 130, thereby off-loading from the main core processor 110 a relatively large processing burden, which in turn improves the data processing throughput that the main core processor can achieve while executing the application according to the sequential programming model.

Figure 5:
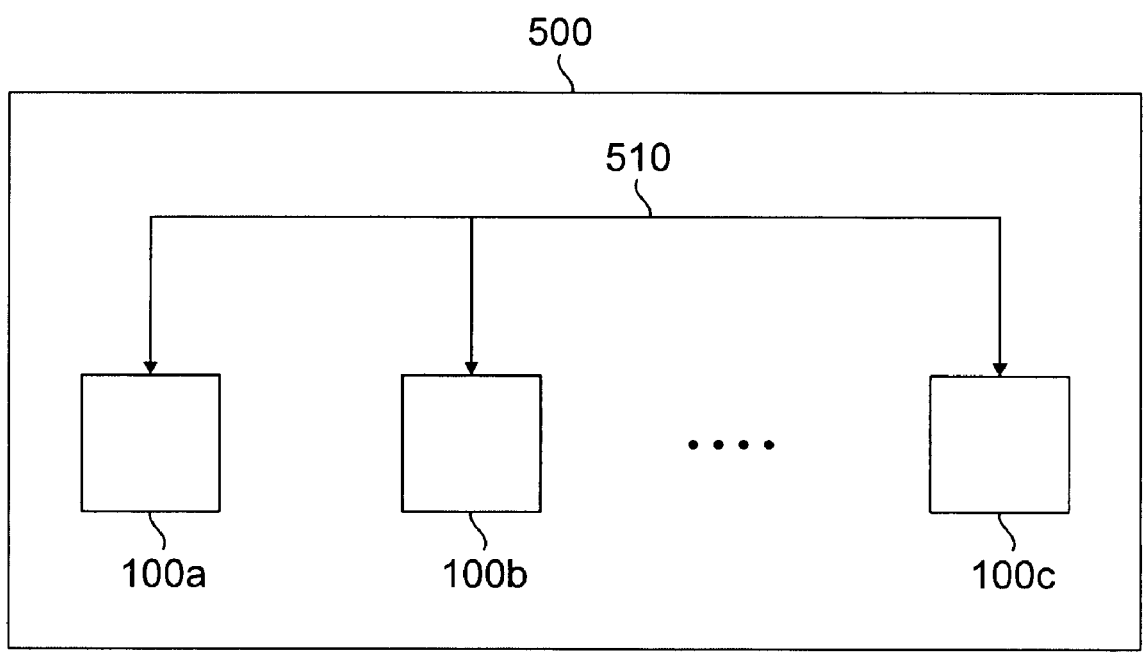
FIG. 5 illustrates an expanded data processing architecture according to an exemplary embodiment of the invention.

FIG. 5 illustrates an expanded data processing architecture according to an exemplary embodiment of the present invention. In the expanded data processing architecture 500 of FIG. 5, a plurality of instances of the data processing architecture 100 described above relative to FIGS. 1-3, designated respectively as 100a, 100b, ... 100c, are interconnected by a bus structure 510. In particular, the bus structure 510 interconnects the main core processors 110 of the respective data processing architectures 100a, 100b, ... 100c. The arrangement of FIG. 5 thus results in an even higher performance architecture.

Although the present invention has been described with an exemplary embodiment, various changes and modifications may be suggested to one skilled in the art. It is intended that the present invention encompass such changes and modifications as fall within the scope of the appended claims.

What is claimed is:

1. A data processing apparatus, comprising:
a main data processor capable running an application;
a plurality of subordinate data processors, each said subordinate data processor including an instruction execution unit which executes program instructions in parallel and independently of said main data processor, where said program instructions are received from said main data processor and perform data communication associated with execution of the application;
a plurality of communication paths which respectively couple said subordinate data processors to said main data processor; and
each of said subordinate data processors responsive to execution of program instructions in its associated execution unit for implementing a data communication channel that performs data communication with an external site that is physically separate from said data processing apparatus, wherein said data communication with said external site is performed via an input/out channel that is physically separate from said plurality of communication paths.

2. The apparatus as set forth in claim 1, wherein each of said subordinate data processors receives from the associated memory information which has been stored in said memory by said main data processor and which is indicative of an instruction to be executed by said instruction execution unit of said subordinate data processor.

3. The apparatus as set forth in claim 2, wherein each of said subordinate data processors includes a memory interface coupled to the associated memory and the associated instruction execution unit and responsive to said instruction execution unit for interfacing said memory to the associated data communication channel.

4. The apparatus as set forth in claim 1, wherein each of said communication paths includes a memory that is shared by said main data processor and the associated subordinate data processor.

5. The apparatus as set forth in claim 4, wherein each of said subordinate data processors includes a memory interface coupled to the associated memory and the associated instruction execution unit and responsive to said instruction execution unit for interfacing said memory to the associated data communication channel.

6. The apparatus as set forth in claim 4, wherein said main data processor and all of said subordinate data processors share said memory.

7. The apparatus as set forth in claim 4, wherein each of said subordinate data processors receives directly from said main data processor information indicative of an instruction to be executed by said instruction execution unit of said subordinate data processor, each of said subordinate data processors including a memory interface coupled to the associated memory and the associated instruction execution unit and responsive to said instruction execution unit for interfacing said memory to the associated data communication channel.

8. The apparatus as set forth in claim 1, wherein said data communication includes one of input data communication from the external site and output data communication to the external site.

9. The apparatus as set forth in claim 8, wherein said data communication includes both said input data communication and said output data communication.

10. The apparatus as set forth in claim 1, further including an operating system, and an application interface which interfaces the application to said operating system, said application interface provided on said main data processor, and at least some of said operating system distributed among said subordinate data processors such that said subordinate data processors provide operating system support for the application running on said main data processor.

11. The apparatus as set forth in claim 10, wherein said operating system is a Linux operating system.

12. The apparatus as set forth in claim 10, wherein said at least some of said operating system performs an operating system function that is accessed relatively frequently by the application running on said main data processor.

13. The apparatus as set forth in claim 10, wherein said application interface renders said distribution of said at least some of said operating system transparent to the application running on said main data processor.

14. The apparatus as set forth in claim 1, wherein the apparatus is implemented as a single integrated circuit.

15. The apparatus as set forth in claim 14, wherein said main data processor includes a RISC processor, and said subordinate data processors include respective RISC microengines.

16. A method of providing a data processor with data communication capability comprising the steps of:
   executing an application on the data processor; and
   providing a plurality of data communication channels which can communicate data with an external site that is physically separate from the data processor, the data associated with execution of the application on the data processor, the providing step including:
      in a corresponding plurality of subordinate data processors, executing program instructions in parallel and independently of the data processor;
      coupling the data communication channels to the data processor via a plurality of communication paths; and
      communicating the data with the external site via an input/out channel that is physically separate from the plurality of communication paths.

17. The method as set forth in claim 16, wherein the data communication channels support one of input data communication from the external site and output data communication to the external site.

18. The method as set forth in claim 17, wherein the data communication channels support both the input data communication and the output data communication.

19. The method as set forth in claim 16, wherein the step of providing includes retrieving from a memory information indicative of the program instructions.

20. The method as set forth in claim 16, wherein the step of providing includes receiving directly from the data processor information indicative of the program instructions.

* * * * *